United States Patent
Pinker et al.

(10) Patent No.: US 12,067,533 B1
(45) Date of Patent: Aug. 20, 2024

(54) SYSTEM, METHOD, AND COMPUTER PROGRAM FOR HANDLING BUSINESS AGREEMENT UPDATES REQUIRING ORCHESTRATION WHEN AN ORCHESTRATION SYSTEM IS UNAVAILABLE

(71) Applicant: Amdocs Development Limited, Limassol (CY)

(72) Inventors: Hila Pinker, Yakir (IL); Kamal Sawan, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 211 days.

(21) Appl. No.: 17/719,167

(22) Filed: Apr. 12, 2022

(51) Int. Cl.
| | |
|---|---|
| *G06Q 30/00* | (2023.01) |
| *G06F 11/30* | (2006.01) |
| *G06F 16/23* | (2019.01) |
| *G06F 16/2457* | (2019.01) |
| *G06Q 10/10* | (2023.01) |

(52) U.S. Cl.
CPC ....... *G06Q 10/103* (2013.01); *G06F 11/3055* (2013.01); *G06F 16/2358* (2019.01); *G06F 16/2365* (2019.01); *G06F 16/2457* (2019.01)

(58) Field of Classification Search
None
See application file for complete search history.

(56) References Cited

U.S. PATENT DOCUMENTS

| | | | |
|---|---|---|---|
| 2003/0074245 A1* | 4/2003 | Salle | G06Q 10/06315 705/7.31 |
| 2005/0283518 A1* | 12/2005 | Sargent | G06F 16/95 709/201 |
| 2007/0039024 A1* | 2/2007 | Krajcev | G06Q 30/02 725/9 |
| 2008/0091742 A1* | 4/2008 | Marshall | G06F 16/29 707/999.203 |
| 2008/0281959 A1* | 11/2008 | Robertson | H04L 43/0817 709/224 |
| 2010/0162374 A1* | 6/2010 | Nair | H04W 12/068 717/172 |
| 2017/0054735 A1* | 2/2017 | Moretti | G06F 3/14 |
| 2019/0253239 A1* | 8/2019 | Shao | G06Q 10/10 |
| 2019/0278767 A1* | 9/2019 | Cao | G06F 16/2365 |
| 2019/0280918 A1* | 9/2019 | Hermoni | H04L 41/069 |
| 2019/0324663 A1* | 10/2019 | Kass | G06F 1/14 |
| 2020/0204466 A1* | 6/2020 | Moore | H04N 1/00506 |
| 2021/0117917 A1* | 4/2021 | Oswald | G06Q 30/0603 |
| 2021/0124722 A1* | 4/2021 | Srivastava | H04L 9/3236 |
| 2021/0133903 A1* | 5/2021 | Poole, III | G06Q 50/188 |
| 2021/0158333 A1* | 5/2021 | Cohen | G06Q 20/4014 |
| 2021/0232757 A1* | 7/2021 | Lim | G06F 11/302 |
| 2021/0256071 A1* | 8/2021 | Lee | G06F 16/2358 |
| 2021/0385165 A1* | 12/2021 | Nádas | H04L 47/326 |

* cited by examiner

*Primary Examiner* — Matthew T Sittner
(74) *Attorney, Agent, or Firm* — Zilka-Kotab, P.C.

(57) ABSTRACT

As described herein, a system, method, and computer program are provided for handling business agreement updates requiring orchestration when an orchestration system is unavailable. A signed update to a business agreement requiring orchestration by an orchestration system is received. It is determined that the orchestration system is unavailable to orchestrate requirements of the signed update to the business agreement. One or more actions are performed to handle the signed update in response to determining that the orchestration system is unavailable.

11 Claims, 6 Drawing Sheets

SYSTEM, METHOD, AND COMPUTER PROGRAM FOR HANDLING BUSINESS AGREEMENT UPDATES REQUIRING ORCHESTRATION WHEN AN ORCHESTRATION SYSTEM IS UNAVAILABLE

FIELD OF THE INVENTION

The present invention relates to managing changes to business agreements requiring orchestration with external systems.

BACKGROUND

After a business agreement is signed by one or both parties to the agreement, such as a telecommunications business agreement for business-to-business (B2B) or business-to-consumer (B2C) customers, a Configure, price, quote (CPQ) system is configured to notify an orchestration system that interfaces the external systems needed to fulfill the agreement. The CPQ system will hand over data associated with the agreement to the orchestration system for use in orchestrating the external systems to fulfill, and even bill for, the various aspects of the agreement.

A similar process occurs when any changes made to the agreement are signed. However, in a situation where the orchestration system is unavailable, such as offline due to an error, network issue, etc., the signed changes will be blocked such that fulfillment is not possible. In turn, any subsequent signed changes may also be blocked.

There is thus a need for addressing these and/or other issues associated with the prior art. For example, there is a need for handling of business agreement updates when the orchestration system is unavailable.

SUMMARY

As described herein, a system, method, and computer program are provided for handling business agreement updates requiring orchestration when an orchestration system is unavailable. A signed update to a business agreement requiring orchestration by an orchestration system is received. It is determined that the orchestration system is unavailable to orchestrate requirements of the signed update to the business agreement. One or more actions are performed to handle the signed update in response to determining that the orchestration system is unavailable.

DETAILED DESCRIPTION

Figure 1:
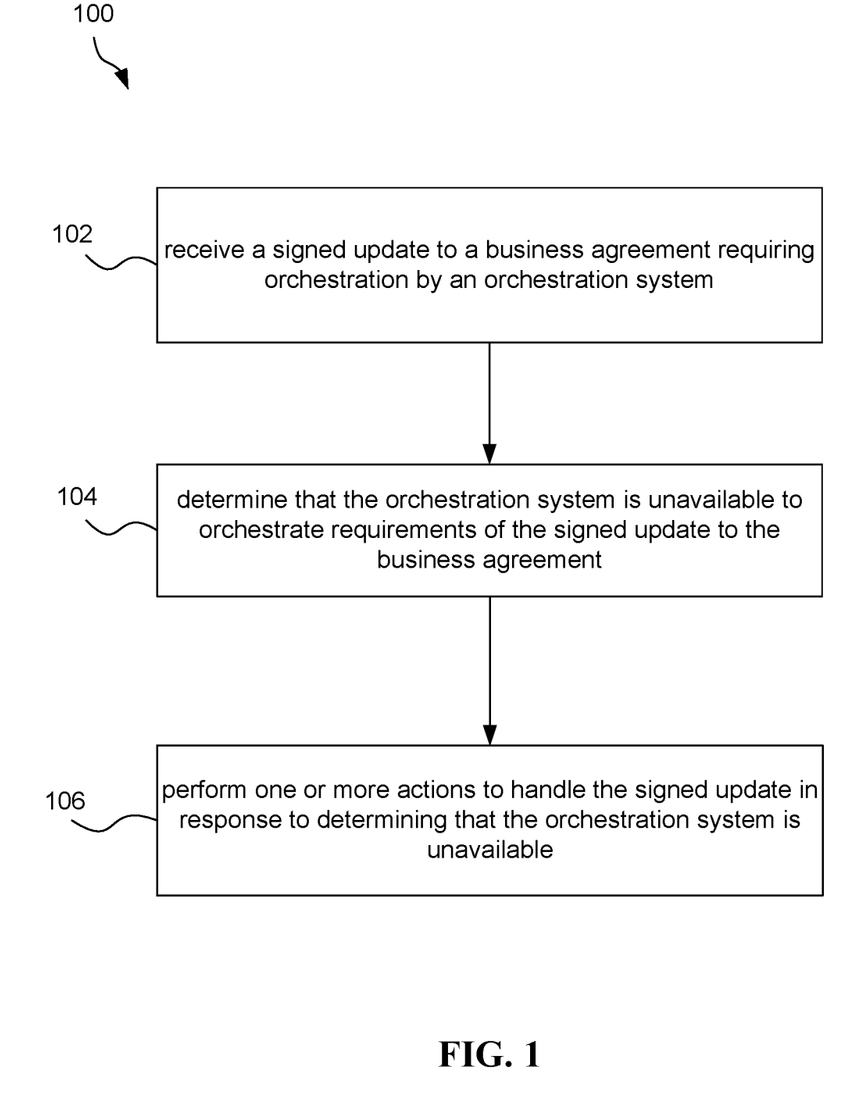
FIG. 1 illustrates a method for handling business agreement updates requiring orchestration when an orchestration system is unavailable, in accordance with one embodiment.

FIG. 1 illustrates a method 100 for handling business agreement updates requiring orchestration when an orchestration system is unavailable, in accordance with one embodiment. The method 100 may be performed by any computer system(s) described below with respect to FIGS. 4 and/or 5. In one example described herein, the method 100 may be performed by a computer system that receives information defining business agreements and business agreement update and that interfaces an orchestration system used for processing the business agreements and updates for fulfillment thereof.

In operation 102, a signed update to a business agreement requiring orchestration by an orchestration system is received. With respect to the present description, a business agreement refers to any agreement made between two parties that has a plurality of requirements to be processed by an orchestration system for fulfillment of the agreement. For example, the business agreement may be a B2B agreement or a B2C agreement.

In one exemplary embodiment, the business agreement may be an agreement for a telecommunications service (e.g. network, etc.) deployment which includes various requirements. With respect to this embodiment, the business agreement may involve (i.e. require) a plurality of sites (e.g. premises, locations, etc.) at which the telecommunications service is to be deployed. As another option with respect to this embodiment, the business agreement may involve a plurality of sub-services to be deployed which make up the telecommunications service. As yet another option with respect to this embodiment, the business agreement may involve a plurality of products (e.g. computer hardware, etc.) required to deploy the telecommunications service.

In any case, the business agreement may include requirements for a plurality of different (e.g. internal and/or external) systems in order to fulfill the various aspects of the business agreement. For example, different systems may provide different required products and/or sub-services. To this end, business agreement may require orchestration across the different systems for fulfillment of the business agreement. As noted above, the orchestration is performed by an orchestration system. The orchestration system is any system that interfaces the different systems and that includes processes for orchestrating fulfillment of the business agreement across the different systems.

As also noted above, a signed update to the business agreement (which also requires orchestration by the orchestration system) is received. The signed update may refer to any amendment (e.g. modification, change, etc.) made to a prior version of the business agreement that includes requirements to be orchestrated by the orchestration system for fulfillment of the signed update. The update may be "signed" by virtue of an acceptance of the update by one or more parties to the business agreement.

With respect to the exemplary embodiment above where the business agreement relates to a telecommunications service deployment, the signed update may include a change to one or more sites of the plurality of sites. As another option with telecommunications service deployment, the signed update may include a change to one or more of the sub-services. As yet another option with telecommunications service deployment, the signed update may include a change to one or more of the products.

In an embodiment, the signed update may be received via an amendment process. The amendment process may refer to an existing computer process (i.e. flow) through which amendments to an existing business agreement may be created and signed.

In operation 104, it is determined that the orchestration system is unavailable to orchestrate the requirements of the signed update to the business agreement. The orchestration system may be considered to be "unavailable" when the orchestration system is, for any reason, unable to complete orchestration of the requirements of the signed update. For example, the orchestration system may be offline due to an error, network issue, etc.

In an embodiment, the orchestration system may be determined to be unavailable when the orchestration system is unresponsive. For example, the orchestration system may be unresponsive to a request to orchestrate the requirements of the signed update. In another embodiment, the orchestration system may be determined to be unavailable when submission of the signed update to the orchestration system has failed. For example, the orchestration system may be determined to be unavailable when a message is received indicating that the submission of the signed update to the orchestration system failed. Of course, any other manner of determining an unavailable state of the orchestration system may be used, such as periodic status checks.

In operation 106, one or more actions are performed to handle the signed update in response to determining that the orchestration system is unavailable. The one or more actions refer to any actions that are preconfigured for handling a situation where the orchestration system is unavailable to orchestrate the requirements of a signed update to a business agreement.

In one embodiment, the actions may include providing a notification to a user with an ability to resend the signed update to the orchestration system when the orchestration system becomes available. In another embodiment, the actions may include resending the signed update to the orchestration system when the orchestration system becomes available. In yet another embodiment, the actions may include tracking the signed update and any other signed updates received during a time period when the orchestration system is determined to be unavailable.

In still yet another embodiment, the actions may include merging changes included in the signed update with changes included in the any other signed updates received during the time period when the orchestration system is determined to be unavailable. As a further option with respect to this embodiment, the actions may include resending the merged changes to the orchestration system when the orchestration system becomes available.

By performing the one or more actions to handle the signed update when the orchestration system is unavailable, the signed update may not be permanently blocked, but instead may be allowed to be resubmitted when the orchestration system becomes available. This in turn may also allow additional signed updates to be generated for the business agreement without being blocked.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
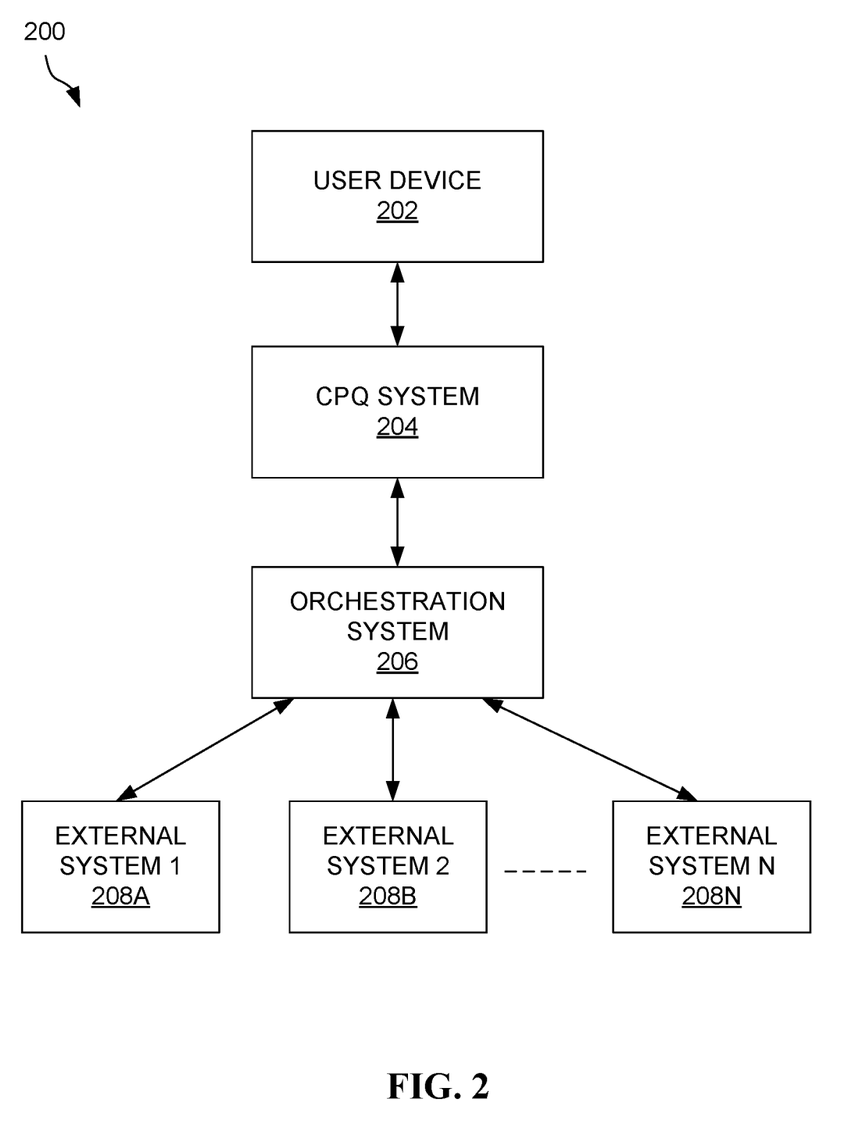
FIG. 2 illustrates a flow diagram of a system for handling business agreement updates requiring orchestration when an orchestration system is unavailable, in accordance with one embodiment.

FIG. 2 illustrates a flow diagram of a system 200 for handling business agreement updates requiring orchestration when an orchestration system is unavailable, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, a user device 202 interfaces (i.e. communicates with) a CPQ system 204 to submit business agreements and business agreement updates to the CPQ system 204. The user device may be any computer system capable of being used by a user (e.g. business customer, party to a business agreement, etc.) for this purpose. The CPQ system 204 may provide one or more user interfaces (UIs) through which the user of the user device 202 can submit signed business agreements and any signed updates to such business agreements.

The CPQ system 204 includes one or more flows for handling the business agreements and business agreement updates. Generally, the CPQ system 204 forwards the received business agreements and business agreement updates, or any data associated therewith, to an orchestration system 206 for orchestration of the requirements of the agreement/update. The orchestration system 206 interfaces a plurality of external systems 208A-N which are able to fulfill the requirements of the agreement/update. Thus, the orchestration system 206 is configured to orchestrate the agreement/update requirements across the of external systems 208A-N for fulfillment thereof, and accordingly to fulfill the agreement/update as a whole.

However, the CPQ system 204 is also configured to determine when the orchestration system 206 is unavailable and to handle a signed update in this situation. In particular, when the orchestration system 206 is unavailable, the CPQ system 204 performs certain actions to handle the signed update. The CPQ system 204 may resend the update when the orchestration system becomes available. The CPQ system 204 may also provide a notification to the user via the user device 202 with an option to resend the update to the orchestration system 206 when it becomes available.

In the meantime, if the agreement requires additional updates, these can be saved on the agreement by the CPQ system 204 and all the updates will be resent to the orchestration system 206 when it becomes available. In this way the agreement is not blocked and can be available to be updated with more changes as requested. When the updates will be resent to the orchestration system 206, the last updated changes will be sent, which means that only the relevant changes (even if these changes were done in different update requests on separate amendment proposals). This solution will allow an increase in revenues when additional business orders will be allowed on the agreement independently to the other external systems availability. The customer service related to allowing updates will also become more efficient.

Figure 3:
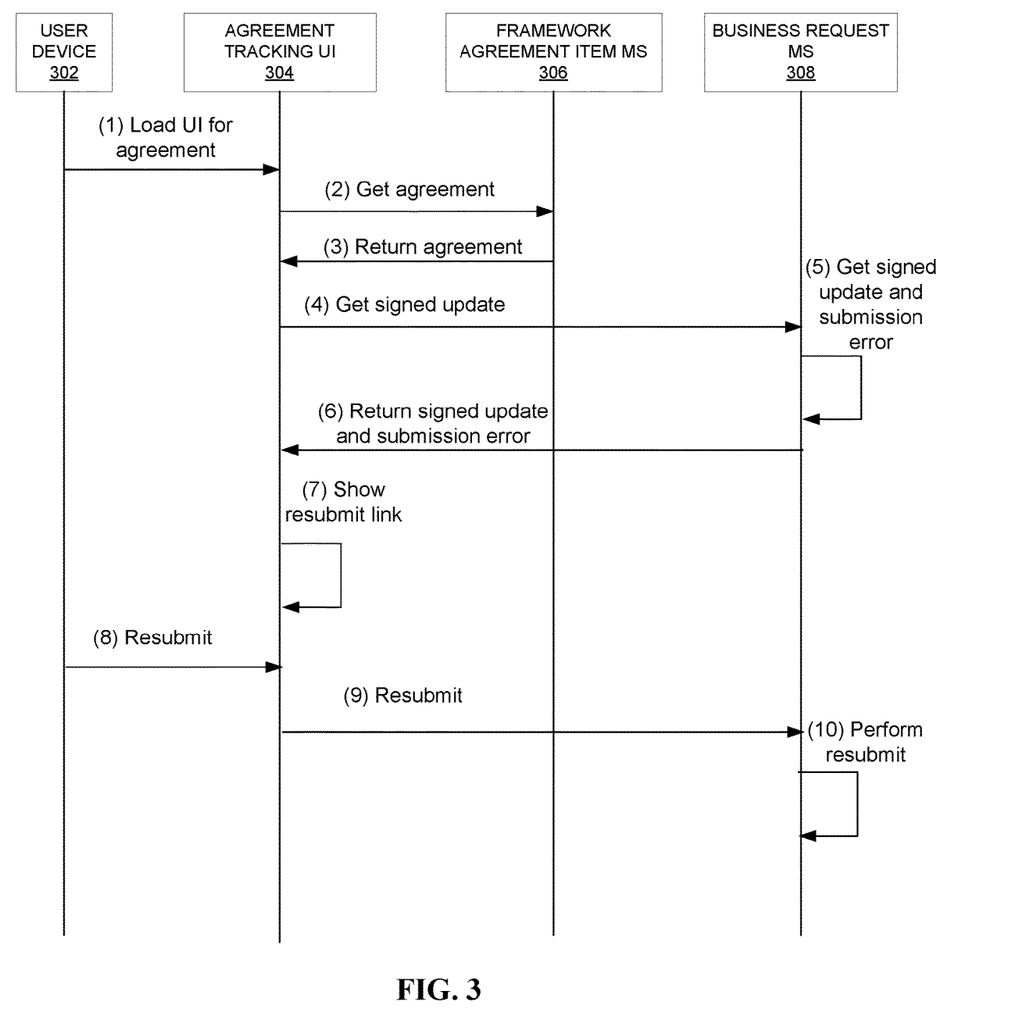
FIG. 3 illustrates a communication flow diagram for handling business agreement updates requiring orchestration when an orchestration system is unavailable, in accordance with one embodiment.

FIG. 3 illustrates a communication flow diagram for handling business agreement updates requiring orchestration when an orchestration system is unavailable, in accordance with one embodiment. As an option, the communication flow may be implemented in the context of the details of the previous figure and/or any subsequent figure(s). Of course, however, the communication flow may be implemented in the context of any desired environment. Further, the aforementioned definitions may equally apply to the description below.

In step (1), a user device 302 requests to load a UI for an existing business agreement. The request is made to an agreement tracking UI 304. In step (2), the agreement tracking UI 304 issues a commend to GET the agreement from a framework agreement item (MS) 306. The framework agreement item MS 306 manages (e.g. stores, etc.) signed business agreements.

In step (3), the framework agreement item MS 306 returns the requested business agreement to the agreement tracking UI 304 for presentation on the user device 302. In step (4), the agreement tracking UI 304 also issues a command to GET any signed updates to the agreement from a business request MS 308. The business request MS 308 manages signed updates received for existing agreements as business requests that are submitted to an orchestration system.

In step (5), the business request MS 308 retrieves a signed update as well as a submission error tracked for the signed update. The submission error indicates that the orchestration system was unavailable to process (i.e. orchestrate) the signed update when it was submitted. In step (6), the business request MS 308 returns the signed update and submission error to the agreement tracking UI 304.

In step (7), the agreement tracking UI 304 presents a resubmit link on the user device 302. The resubmit link allows a user of the user device 302 to resubmit the signed update to the orchestration system when the orchestration system becomes available. In step (8), the user device 302 issues a resubmit command to the agreement tracking UI 304 (i.e. via user selection of the presented link). In step (9), the agreement tracking UI 304 issues the resubmit command to the business request MS 308. In step (10), the business request MS 308 performs the resubmit, in particular by resubmitting the signed update to the orchestration system.

Figure 4:
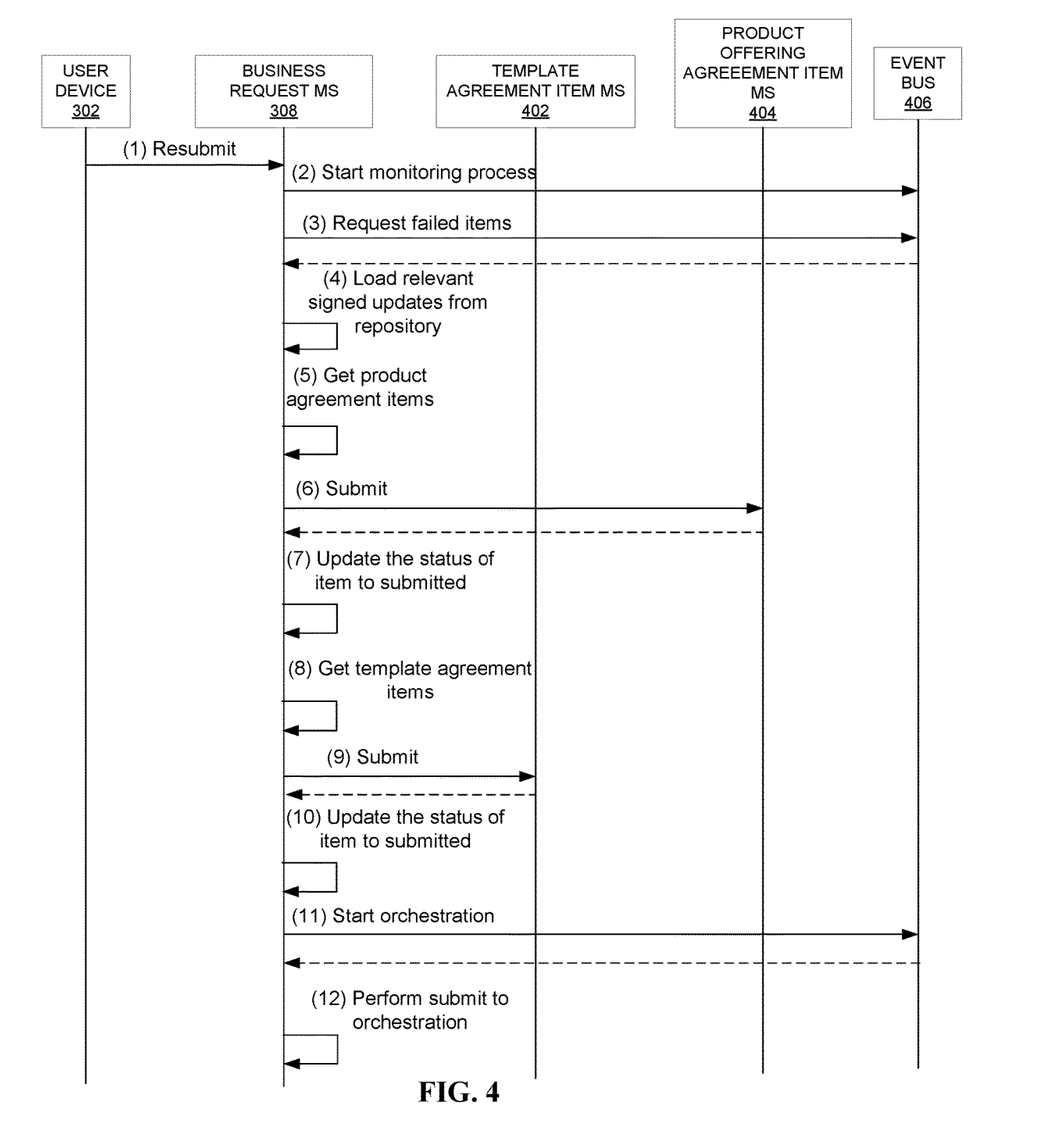
FIG. 4 illustrates a communication flow diagram for resending previously failed business agreement updates to an orchestration system, in accordance with one embodiment.
Figure 5:
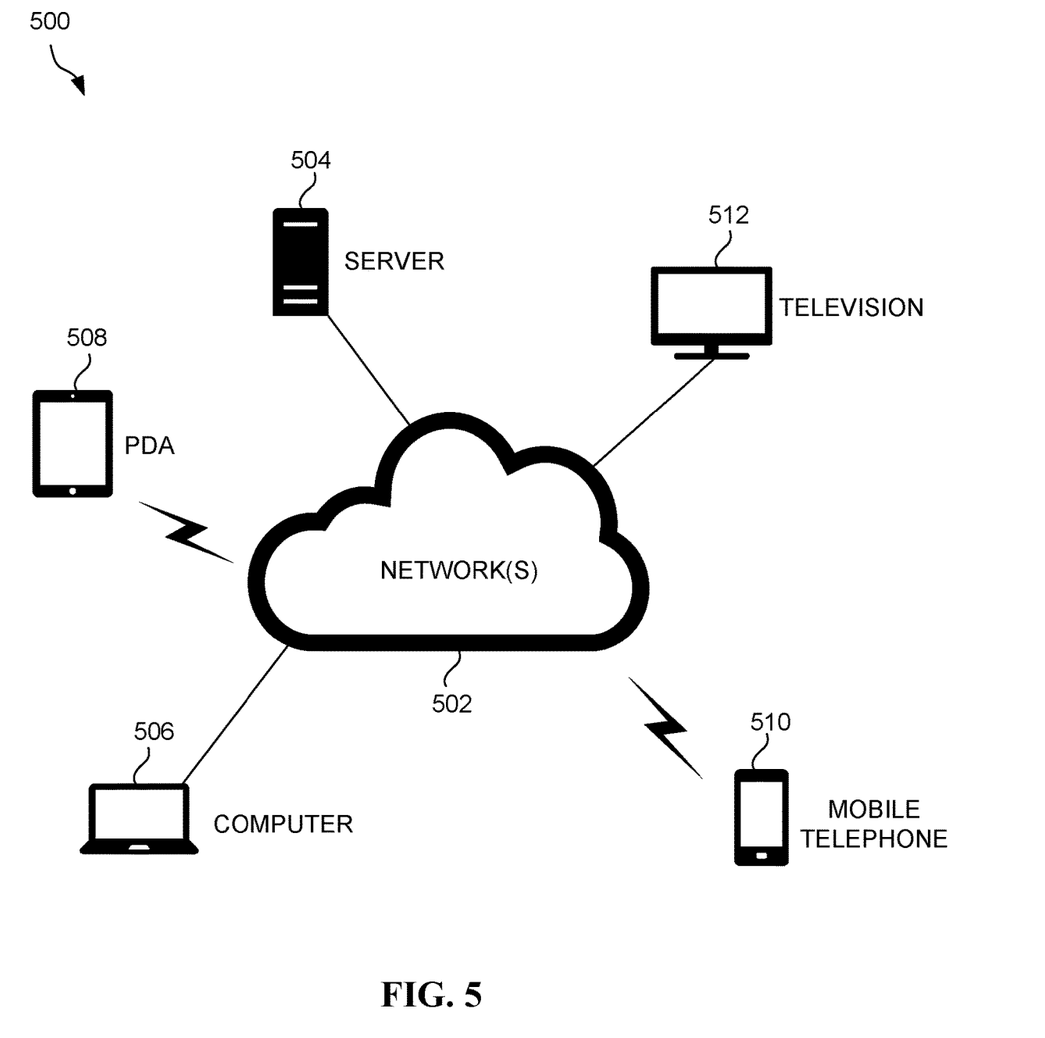
FIG. 5 illustrates a network architecture, in accordance with one possible embodiment.

FIG. 4 illustrates a communication flow diagram for resending previously failed business agreement updates to an orchestration system, in accordance with one embodiment. As an option, the communication flow may be implemented in the context of the details of the previous figure and/or any subsequent figure(s). Of course, however, the communication flow may be implemented in the context of any desired environment. Further, the aforementioned definitions may equally apply to the description below.

In step (1), a user device 302 issues a resubmit command which is received by a business request MS 308. The resubmit command may be issued as described in above in step (8) of FIG. 3. In step (2), the business request MS 308 starts an event monitoring process with an event bus 406. In step (3), the business request MS 308 sends a request for failed items to the event bus 406. The failed items refer to signed updates to a business agreement that failed to be processed by an orchestration system (i.e. due to unavailability of the orchestration system). As shown, the event bus 406 returns the failed items to the business request MS 308. In step (4), the business request MS 308 loads the relevant signed updates from a repository. The relevant signed updates refer to updates corresponding to the failed items. The relevant signed updates may be retrieved using an identifier (id) of each of the failed items which corresponds with an identifier of a signed update in the repository.

In step (5), the business request MS 308 gets product agreement items (i.e. product requirements of the signed updates that were retrieved in step (4). In step (6), the business request MS 308 performs a submit operation with a product offering agreement MS 404. The submit operation involves instructing the product offering agreement MS 404 to (A) freeze the product agreement items and to (B) update a status of the product agreement items to indicate they have been submitted to an orchestration system for orchestration.

In step (7), the business request MS 308 updates a status of the signed updates to "submitted." In step (8), the business request MS 308 gets template agreement items. Template agreement items refer to other signed updates that were submitted after the signed updates retrieved in step (4). The template agreement items may accordingly represent later versions of the base business agreements. In step (9), the business request MS 308 performs a submit operation with a template agreement item MS 402. This submit operation involves instructing the template agreement item MS 402 to freeze the template agreement items.

In step (10), the business request MS 308 updates a status of the template agreement items to "submitted." In step (11), the business request MS 308 sends a start orchestration message to the event bus 406. In step (12), the business request MS 308 submits the signed updates and any other (later) signed updates to the orchestration system for orchestration thereof.

With respect to the present embodiment, the business request MS 308 may be configured to not resubmit a signed update which has a status of "cancelled" or "overridden," since this means that there is a signed update in a higher version that replaces the signed update. The business request MS 308 may be configured to not resubmit a signed update which has a status of "submitted-completed" since this could indicate that the previous signed update was a partial success with regard to orchestration.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
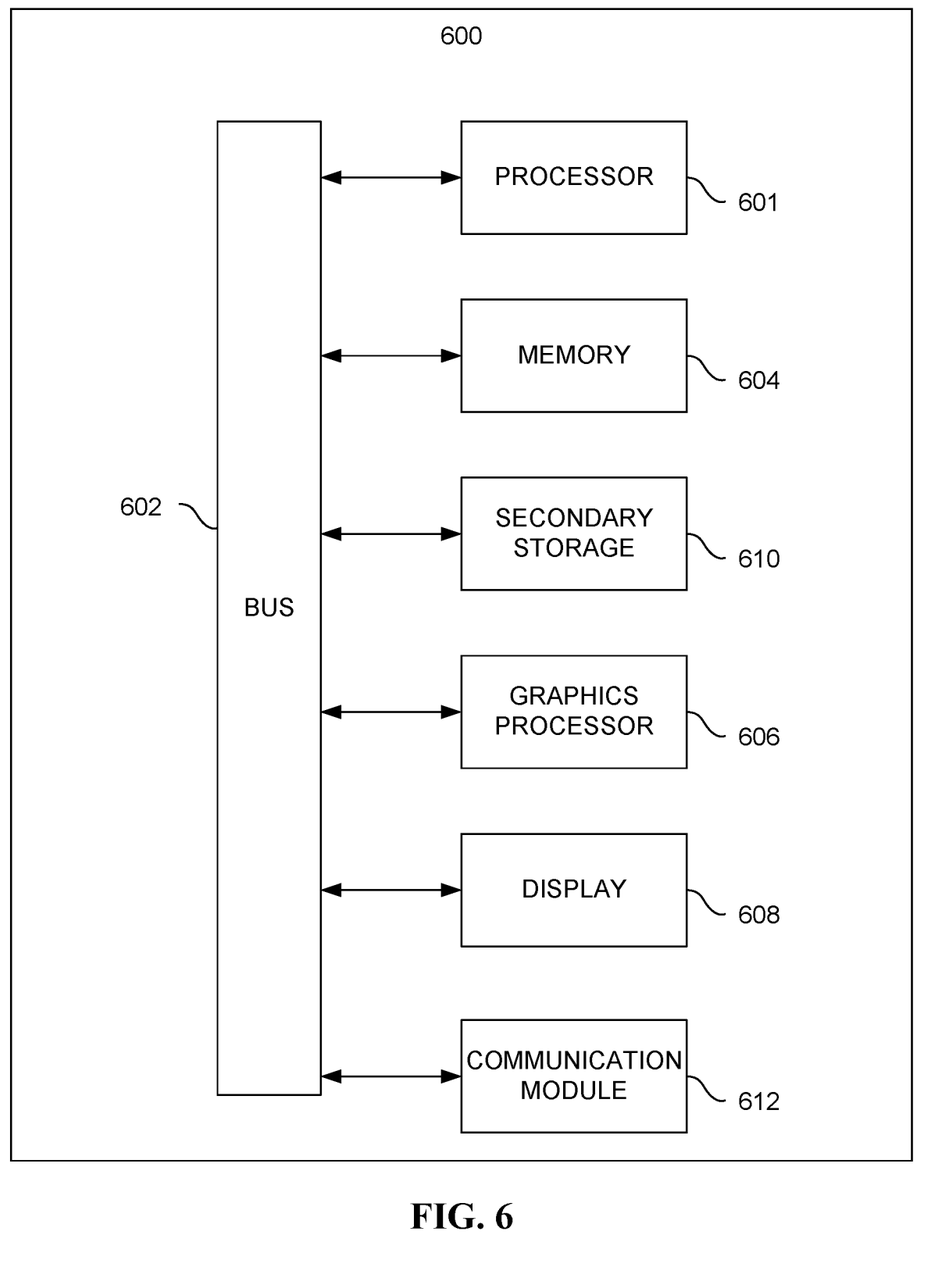
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
receive a signed update to a business agreement requiring orchestration by an orchestration system across a plurality of external systems for fulfillment of the business agreement, the signed update indicating a change to one or more services provided by one or more external systems of the plurality of external systems;
in response to receiving the signed update, determine that the orchestration system is unavailable to orchestrate requirements of the signed update to the business agreement including that the orchestration system is unavailable to make the change the one or more services provided by the one or more external systems in accordance with the signed updated; and
perform one or more actions to handle the signed update in response to determining that the orchestration system is unavailable, including:
tracking the signed update and at least one additional signed update received during a time period when the orchestration system is determined to be unavailable,
merging changes included in the signed update with changes included in the at least one additional signed update during the time period when the orchestration system is determined to be unavailable;
after performing the one or more actions, determine that the orchestration system is available to orchestrate requirements of the signed update to the business agreement; and
in response to determining that the orchestration system is available:
freeze the at least one additional signed update, and
send the merged changes to the orchestration system for orchestration thereof.

2. The non-transitory computer-readable media of claim 1, wherein the business agreement is an agreement for a telecommunications service deployment.

3. The non-transitory computer-readable media of claim 2, wherein the business agreement involves a plurality of sites.

4. The non-transitory computer-readable media of claim 1, wherein the orchestration system interfaces the plurality of external systems for the orchestration across the plurality of external systems.

5. The non-transitory computer-readable media of claim 1, wherein the signed update is received via an amendment process.

6. The non-transitory computer-readable media of claim 1, wherein the orchestration system is determined to be unavailable when the orchestration system is unresponsive.

7. The non-transitory computer-readable media of claim 1, wherein the orchestration system is determined to be unavailable when submission of the signed update to the orchestration system has failed.

8. The non-transitory computer-readable media of claim 7, wherein the orchestration system is determined to be unavailable when a message is received indicating that the submission of the signed update to the orchestration system failed.

9. The non-transitory computer-readable media of claim 1, wherein handling the signed update when the orchestration system is determined to be unavailable allows for the at least one additional signed update to be generated for the business agreement.

10. A method, comprising:
at a computer system:
receiving a signed update to a business agreement requiring orchestration by an orchestration system across a plurality of external systems for fulfillment of the business agreement, the signed update indicating a change to one or more services provided by one or more external systems of the plurality of external systems;
in response to receiving the signed update, determining that the orchestration system is unavailable to orchestrate requirements of the signed update to the business agreement including that the orchestration system is unavailable to make the change the one or more services provided by the one or more external systems in accordance with the signed updated; and
performing one or more actions to handle the signed update in response to determining that the orchestration system is unavailable, including:
tracking the signed update and at least one additional signed update received during a time period when the orchestration system is determined to be unavailable,
merging changes included in the signed update with changes included in the at least one additional signed update during the time period when the orchestration system is determined to be unavailable;
after performing the one or more actions, determining that the orchestration system is available to orchestrate requirements of the signed update to the business agreement; and
in response to determining that the orchestration system is available:
freezing the at least one additional signed update, and
sending the merged changes to the orchestration system for orchestration thereof.

11. A system, comprising:
a non-transitory memory storing instructions; and
one or more processors in communication with the non-transitory memory that execute the instructions to:
receive a signed update to a business agreement requiring orchestration by an orchestration system across a plurality of external systems for fulfillment of the business agreement, the signed update indicating a change to one or more services provided by one or more external systems of the plurality of external systems;
in response to receiving the signed update, determine that the orchestration system is unavailable to orchestrate requirements of the signed update to the business agreement including that the orchestration system is unavailable to make the change the one or more services provided by the one or more external systems in accordance with the signed updated; and
perform one or more actions to handle the signed update in response to determining that the orchestration system is unavailable, including:

tracking the signed update and at least one additional signed update received during a time period when the orchestration system is determined to be unavailable, merging changes included in the signed update with changes included in the at least one additional signed update during the time period when the orchestration system is determined to be unavailable;

after performing the one or more actions, determine that the orchestration system is available to orchestrate requirements of the signed update to the business agreement; and in response to determining that the orchestration system is available:

freeze the at least one additional signed update, and send the merged changes to the orchestration system for orchestration thereof.

\* \* \* \* \*